B. W. FELTON.
Ventilator for Chimney-Caps, &c.

No. 226,507. Patented April 13, 1880.

Witnesses:
W. J. Cambridge
Chas. E. Griffin

Inventor,
Benj. W. Felton
per R. C. Wachemacher
Atty

N. PETERS, PHOTO-LITHOGRAPHER, WASHINGTON, D. C.

UNITED STATES PATENT OFFICE.

BENJAMIN W. FELTON, OF BOSTON, MASSACHUSETTS.

VENTILATOR FOR CHIMNEY-CAPS, &c.

SPECIFICATION forming part of Letters Patent No. 226,507, dated April 13, 1880.

Application filed January 29, 1880.

*To all whom it may concern:*

Be it known that I, BENJAMIN W. FELTON, of Boston, in the county of Suffolk and State of Massachusetts, have invented certain Improvements in Ventilators for Buildings, Chimney-Caps, &c., of which the following is a full, clear, and exact description, reference being had to the accompanying drawings, making part of this specification, in which—

Figure 1:
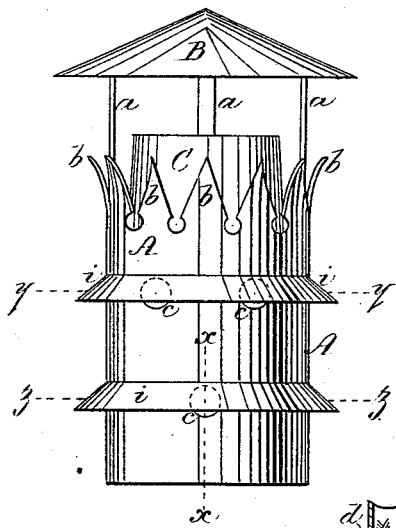
Figure 2:
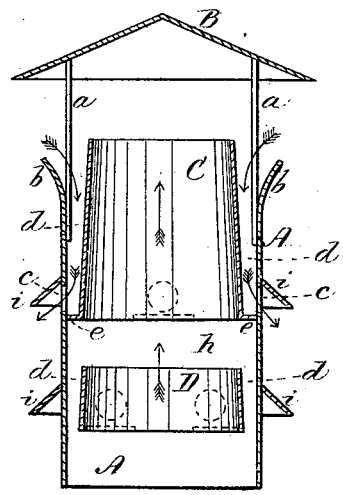
Figure 3:
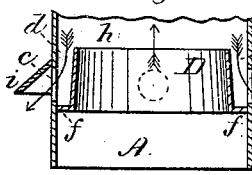
Figure 4:
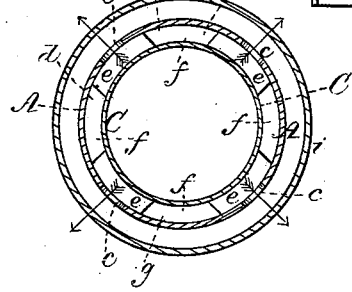
Figure 5:
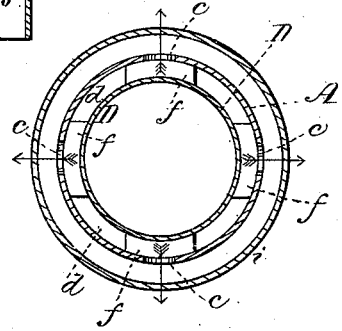
Figure 6:
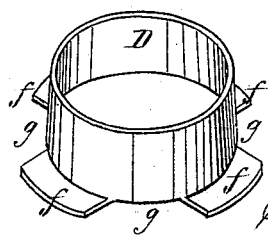

Figure 1 is a side elevation of a ventilator constructed in accordance with my invention. Fig. 2 is a vertical section through the center of the same. Fig. 3 is a vertical section on the line $x\,x$ of Fig. 1. Fig. 4 is a horizontal section on the line $y\,y$ of Fig. 1. Fig. 5 is a similar section on the line $z\,z$ of Fig. 1; Fig. 6, detail in perspective.

My invention has for its object to prevent the upward currents of air or smoke passing through a ventilator from being broken up or disturbed by the downward currents of air produced by the force of the wind or the dampness and weight of the atmosphere; and my invention consists in the combination, with an eduction-pipe provided with a series of lateral discharge-apertures, of one or more short tapering pipes of less diameter than the eduction-pipe, and arranged concentrically within it, so as to leave an air-space between them, the inner pipes being supported by a series of short flanges or lips extending across the air-space, one immediately beneath each outlet-aperture in the side of the eduction-pipe, these flanges serving as partial stops to arrest the progress of the downward currents of air and deflect them out through the discharge-apertures, by which construction and arrangement of parts the downward currents of air, which, on account of the strength of the upward current at the center, generally descend the eduction-pipe near its circumference, are caused to escape at the lateral discharge-orifices thereof, and are thus prevented from exerting an inward pressure upon and breaking up or obstructing the free passage of the uprising column of air or smoke, as would otherwise occur, and consequently the strength and velocity of the upward current are materially increased, and the ventilation thereby rendered more perfect and effective.

To enable others skilled in the art to understand and use my invention, I will proceed to describe the manner in which I have carried it out.

In the said drawings, A represents the main or eduction pipe, through which the air or smoke is drawn up from the ventilating flue or chimney to which it is attached. The top of this pipe A, which is made slightly flaring and with ornamental points $b$, is surmounted by an ordinary conical weather-cap, B, which is supported upon rods or braces $a$ projecting up from and secured to the inner surface of the pipe A, and serves to exclude the rain or snow in stormy weather and prevent the full force of the wind from blowing down the eduction-pipe.

In the sides of the pipe A are two series of discharge-apertures, $c$, and within this pipe are arranged concentrically two tapering or slightly conical pipes, C D, which are of less diameter than the interior of the pipe A, so as to leave an air-space, $d$, between them, and are supported and secured in place by means of a series of short projecting flanges or lips, $e\,f$, which are of the same length as the spaces $g$ between them and extend across the air-space $d$, one immediately beneath each of the discharge-orifices $c$, the flanges $e$ of the pipe C being located immediately beneath the upper discharge-orifices, and the flanges $f$ of the pipe D immediately beneath the lower discharge-orifices, while the flanges $e$ of the upper pipe are arranged immediately over the spaces $g$, between the flanges $f$ of the lower pipe.

The pipe C extends above the pointed top of the pipe A, so as to protect the upward column of air or smoke from the lateral force of the wind, and is slightly contracted at the top, so as to present a reduced area of surface to be acted upon by the pressure of the external air.

The downward currents of air produced by the force of the wind or weight of the atmosphere pass down the space $d$ between the eduction-pipe A and the pipes C D, and are thus prevented from impinging upon and breaking up or disturbing the column of air or smoke ascending through the pipes D C, which is thus left free and unobstructed, while as soon as the descending currents of air in the space $d$ come into contact with the flanges $e\,f$ their downward progress is partially stopped or arrested and they are deflected out through the discharge-orifices c, and by thus affording a means of escape for the descending currents of air they are still further prevented from acting upon and breaking up or interfering with the uprising currents through the center of the ventilator, the force and velocity of which are thus materially increased and more perfect results thereby attained.

Instead of both of the inner pipes C D being employed, the upper one, C, only may be used. I prefer, however, to use the pipe D, for the reason that if the wind should blow with such force as to produce a downward current of air within the inner pipe C it will escape at the space $h$ between the bottom of the pipe C and the top of the pipe D, and pass into the space $d$ between the latter and the pipe A, and be discharged thence out through the lower row of openings, c; and it will thus be seen that in this manner the upward current is relieved of the pressure of any downward current within the pipe C which would tend to break up or obstruct its passage.

If desired, three or more inner pipes may be employed, in which case the pipe A would be provided with a series of discharge-orifices opposite each of the inner pipes, immediately above the flanges thereof.

To the outside of the pipe A, over each series or row of discharge-orifices c, is secured an inclined deflector, i, which serves as a guard to prevent the force of the wind from obstructing or interfering with the free escape of the air from the discharge-orifices.

What I claim as my invention, and desire to secure by Letters Patent, is—

In a ventilator, the combination, with an eduction-pipe, A, provided with a series of lateral discharge-orifices, c, of one or more pipes, C D, arranged within the pipe A, with an intervening air-space, d, and having supporting flanges or deflectors extending across the air-space immediately beneath the outlet-orifices c, whereby the downward currents of air are caused to be discharged outward and prevented from impinging upon and breaking up or obstructing the free passage of the column of air or smoke ascending through the ventilator, substantially as set forth.

Witness my hand this 27th day of January, A. D. 1880.

BENJAMIN W. FELTON.

In presence of—
P. E. TESCHEMACHER,
W. J. CAMBRIDGE.